(12) United States Patent
Pawar

(10) Patent No.: US 9,678,560 B2
(45) Date of Patent: Jun. 13, 2017

(54) METHODS AND APPARATUSES TO WAKE COMPUTER SYSTEMS FROM SLEEP STATES

(75) Inventor: Sagar C. Pawar, Aurangabad (IN)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 13/997,600

(22) PCT Filed: Nov. 28, 2011

(86) PCT No.: PCT/US2011/062262
§ 371 (c)(1),
(2), (4) Date: Jun. 24, 2013

(87) PCT Pub. No.: WO2013/081578
PCT Pub. Date: Jun. 6, 2013

(65) Prior Publication Data
US 2013/0290762 A1 Oct. 31, 2013

(51) Int. Cl.
*G06F 1/32* (2006.01)
*G06F 9/44* (2006.01)

(52) U.S. Cl.
CPC .......... *G06F 1/3234* (2013.01); *G06F 1/3215* (2013.01); *G06F 9/4418* (2013.01); *G06F 9/4411* (2013.01)

(58) Field of Classification Search
None
See application file for complete search history.

(56) References Cited

U.S. PATENT DOCUMENTS

| 7,450,726 B2 * | 11/2008 | Goyal | H04M 1/6058 307/125 |
| 2006/0024523 A1 | 2/2006 | Tagami et al. | |
| 2006/0294523 A1 | 12/2006 | Beard et al. | |

(Continued)

FOREIGN PATENT DOCUMENTS

| TW | 201104408 A | 2/2011 |
| TW | M412423 | 9/2011 |

OTHER PUBLICATIONS

PCT/US2011/062262 Notification Concerning Transmittal of International Preliminary Report on Patentability, mailed Jun. 12, 2014, 5 pages.

(Continued)

*Primary Examiner* — Thomas Lee
*Assistant Examiner* — Vincent Chang
(74) *Attorney, Agent, or Firm* — Blakely, Sokoloff, Taylor & Zafman LLP

(57) ABSTRACT

Embodiments of the invention describe apparatuses, systems and methods to detect, during a host platform sleep state, a peripheral device audio jack plug being coupled to (e.g., inserted into) an audio jack connection socket. A specific sleep state of the host platform may be determined, and a system wake event may be generated so that the host platform wakes from the sleep state in response to the peripheral device being coupled to the audio jack connection socket. Thus, embodiments of the invention incorporated in handheld mobile computing devices such as smartphones and tablet computers with limited input/output (I/O) provide a user with alternative means for waking the device from a sleep state.

12 Claims, 6 Drawing Sheets

(56) References Cited

U.S. PATENT DOCUMENTS

| | | | |
|---|---|---|---|
| 2008/0208376 A1* | 8/2008 | Jung | G11B 19/02 |
| | | | 700/94 |
| 2009/0307511 A1* | 12/2009 | Fiennes et al. | 713/323 |
| 2010/0134437 A1 | 6/2010 | Yang et al. | |
| 2011/0157055 A1 | 6/2011 | Tilley et al. | |
| 2011/0173420 A1* | 7/2011 | Chen | G06F 9/3851 |
| | | | 712/220 |
| 2012/0019309 A1* | 1/2012 | Turner | H03K 5/1254 |
| | | | 327/524 |
| 2012/0042184 A1 | 2/2012 | Yeh et al. | |
| 2012/0081102 A1* | 4/2012 | Gao et al. | 324/76.11 |
| 2012/0239918 A1* | 9/2012 | Huang | 713/2 |

OTHER PUBLICATIONS

"International Search Report and Written Opinion of the International Searching Authority for Application No. PCT/US2011/062262", (Jul. 11, 2012), Whole Document.

\* cited by examiner

METHODS AND APPARATUSES TO WAKE COMPUTER SYSTEMS FROM SLEEP STATES

CLAIM OF PRIORITY

This application is a U.S. National Phase application under 35 U.S.C. §371 of International Application No. PCT/US2011/062262, filed Nov. 28, 2011, entitled "METHODS AND APPARATUSES TO WAKE COMPUTER SYSTEMS FROM SLEEP STATES," the entire contents of which are incorporated herein by reference.

FIELD

Embodiments of the invention generally pertain to computing devices and more particularly to power management solutions utilized by handheld mobile computing devices.

BACKGROUND

Various mechanisms exist for reducing power consumption of a platform. Standard technology for power management may be specified, for example, in Advanced Configuration and Power Interface (ACPI) version 5.0, which may be found on the public Internet at URL www-acpi-info (note that periods have been replaced with dashes to avoid unintentional hyperlinks in this document). ACPI is the standard many computer systems currently use for power management and is used to describe how the system looks to the operating system.

Power management capabilities enable a platform, both at component and system level, to change its operating state to use less power and to resume normal operations. These modes of operation are often referred to as sleep and wake modes. A number of events trigger a platform to transition to a low power state or to transition from a low power state to a more active state. In prior art solutions for desktop and laptop devices, limited input/output (I/O) device actions trigger such event—i.e., moving a mouse, pressing a key on the keyboard cause a platform to transition to an active state from a sleep, or low power, state.

Handheld mobile computing devices such as smartphones and tablet computers are designed to have a reduced volume to comply with expected user form factor. As a result, these types of devices typically have limited I/O devices; for example, I/O devices for such mobile computing devices may be limited to a touch screen display interface and a limited about of buttons on the bezel. In most handheld computing devices, the touch screen display is deactivated in low power states in order to conserve power. Thus, solutions are needed to enable a user to "wake" a system from a sleep state using other means.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe apparatuses, systems and methods to detect, during a host platform sleep state, a peripheral device audio jack plug being coupled to (e.g., inserted into) an audio jack connection socket. A specific sleep state of the host platform may be determined, and a system wake event may be generated so that the host platform wakes from the sleep state in response to the peripheral device being coupled to the audio jack connection socket. Thus, embodiments of the invention incorporated in handheld mobile computing devices such as smartphones and tablet computers with limited input/output (I/O) provide a user with alternative means for waking the device from a sleep state.

Figure 1:
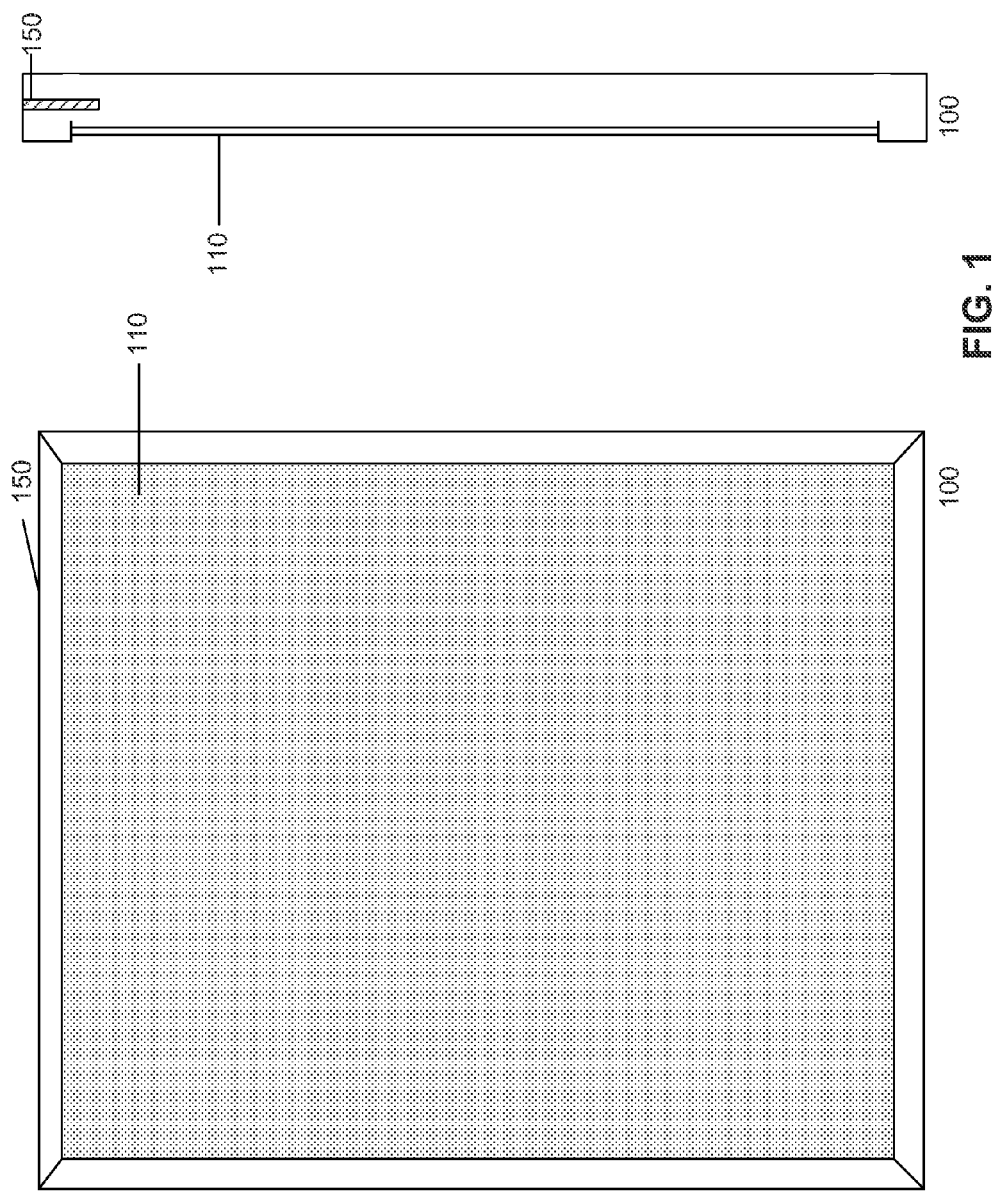
FIG. 1 is an illustration of a handheld mobile computing device incorporating an embodiment of the invention.

FIG. 1 is an illustration of a handheld mobile computing device incorporating an embodiment of the invention. Device 100, shown in front view and cross section view, may be a smartphone or a tablet computer and, in this embodiment, includes touch screen display 110, which functions as both the display for the device and the I/O means for a user of the device.

Device 100 further includes audio jack socket 150. In this embodiment, audio jack socket 150 is a 3.5 mm headphone and microphone socket (i.e., capable of receiving an audio output device such as headphones, an audio input device such as a microphone or a headphone/microphone combination device). In other embodiments, audio jack socket 150 may comprise different sizes and different functionality (e.g., audio output only, audio input only).

Device 100 may execute a series of sleep states for its platform. For example, device 100 may execute sleep states defined by Advanced Configuration and Power Interface (ACPI) version 5.0, which may be found on the public Internet at URL www-acpi-info (note that periods have been replaced with dashes to avoid unintentional hyperlinks in this document).

In this embodiment, device 100 is capable of running off of battery power or by AC power received by the device. In either case, it may be of interest to conserve power consumption of the device; thus after certain periods of inactivity device 100 may enter a sleep state (e.g., S3 as defined by ACHI, which is suspend to random access memory (RAM) where system memory is saved to RAM and power is still supplied to RAM; or S4 as defined by ACHI, which is suspend to disk where the content of main-memory is saved to disk memory and the platform is powered down). Said sleep state may further power off touch screen 110, thereby limiting the options for a user to wake device 100 from sleep. Embodiments of the invention described below enable the insertion of an audio jack plug into audio jack socket 150 to wake a system from sleep.

Figure 2:
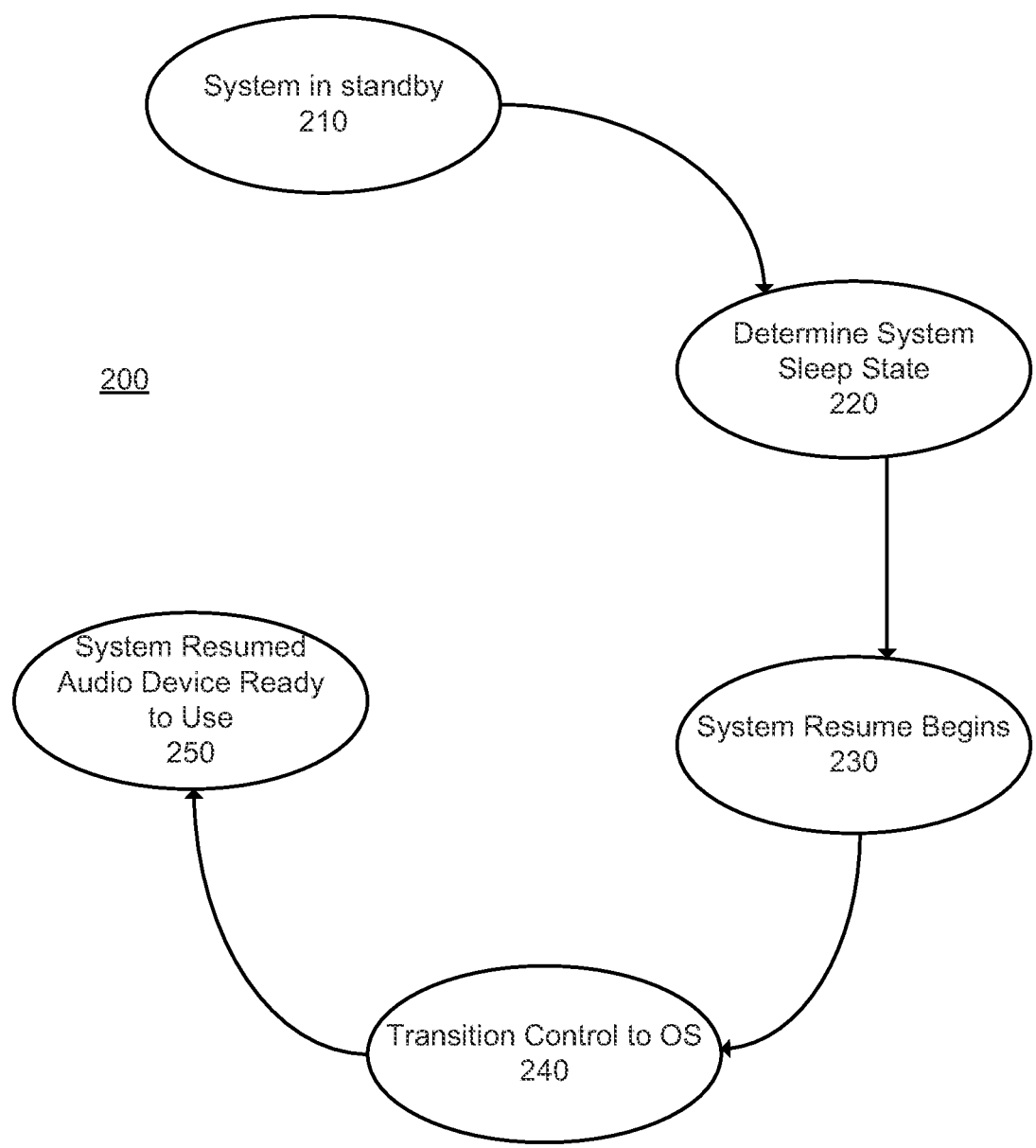
FIG. 2 is a flow diagram of a process according to an embodiment of the invention.

FIG. 2 is a flow diagram of a process according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

As shown in process 200, a system is in a "standby" state, 210. For example, the host platform is powered up, modules or logic initialize the subsystem and loads the operating system (OS); while the OS is running, at some point in time, a system standby (i.e., sleep) event is triggered in the platform, due to time, or inactivity, or user-selection. The OS may trigger a system management interrupt (SMI) to cause a standby state. As described above, said standby state may be a "suspend to RAM" state or a "suspend to disk" sleep state. Once an audio jack plug is inserted into the system audio jack socket, the system sleep state is determined, 220. Said sleep state may be determined, for example, by system registers storing system global states, SMI tracking, etc.

System resume procedures may be executed for the appropriate sleep state and wake event, 230. When the wake event is recognized, the logic or modules such as firmware operate to wake the platform. Memory contents should still be intact and the operational context should be maintained. If the processor was in sleep mode, upon waking the processor resets and re-launches firmware. In some embodiments, firmware may detect that it is not in boot up mode, because in some sleep modes, memory remains intact. Thus, the firmware executes a process dedicated to waking the platform rather than rebooting it. The firmware may not reinitialize memory, for example. Once awakened, the firmware transitions control to the OS, 240. System is resumed fully to an "on" state (e.g., "S0"), and the audio device coupled to the audio jack plug is ready to use, 250.

Figure 3:
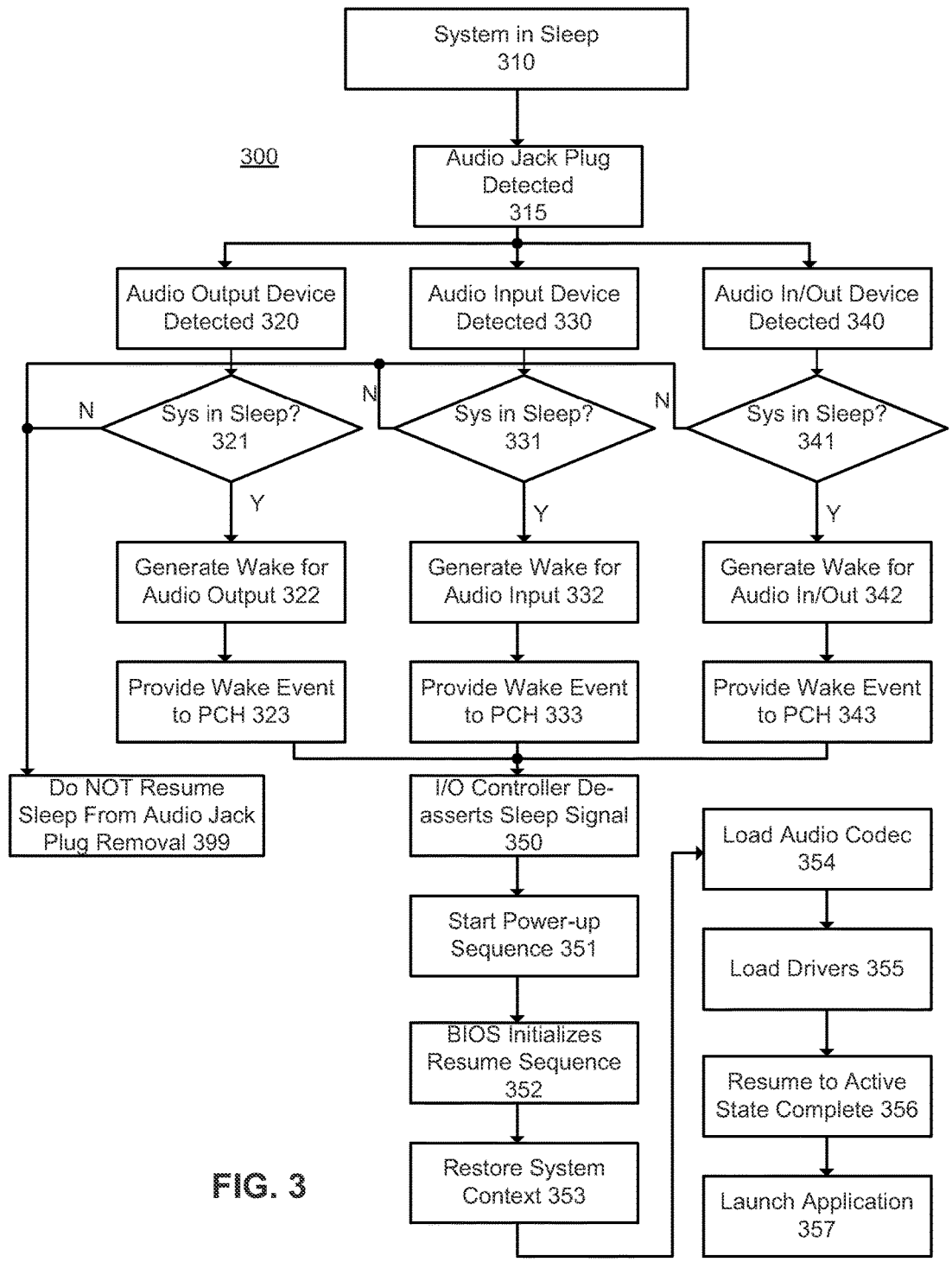
FIG. 3 is a flow diagram of a process according to an embodiment of the invention.

FIG. 3 is a flow diagram of a process according to an embodiment of the invention. In process 300, a system is in a sleep mode, 310, and an audio jack plug is detected in an audio jack socket, 315. In this embodiment, different sub-processes exist for whether the audio device coupled to the audio jack plug is an audio output device (e.g., headphones, speakers), an audio input device (e.g., a microphone), or an audio input/output device.

If an audio output device is detected, 320, then it is determined whether the system is in a sleep state, 321. If the system is not, a sleep state will not resume on audio jack plug removal, 399. If the system is in a sleep state, then the current sleep state of the system is determined, a wake event appropriate for the audio output device inserted is generated (e.g., the appropriate audio codec is identified), 322, and said wake event is provided to platform interconnect 323 (e.g., a platform controller hub (PCH)).

If an audio input device is detected, 330, then it is determined whether the system is in a sleep state, 331. If the system is not, a sleep state will not resume on audio jack plug removal, 399. If the system is in a sleep state, then the current sleep state of the system is determined, a wake event appropriate for the audio input device inserted is generated (e.g., the appropriate audio codec is identified), 332, and said wake event is provided to the platform interconnect, 333.

If an audio input/output device is detected, 340, then it is determined whether the system is in a sleep state, 341. If the system is not, a sleep state will not resume on audio jack plug removal, 399. If the system is in a sleep state, then the current sleep state of the system is determined, a wake event appropriate for the audio input/output device inserted is generated (e.g., the appropriate audio codecs are identified), 342, and said wake event is provided to the platform interconnect, 343.

Once the platform interconnect receives a wake event, an I/O controller may assert (or de-assert) a signal to indicate that a wake event interrupt has been processed, 350. Based on this asserted/de-asserted signal, a platform power-up sequence is executed, 351. Once the power-up sequence is complete, a basic input/output system (BIOS) may initiate an appropriate resume sequence, 352. System contents stored in either RAM (for suspend to RAM sleep) or disk (for suspend to disk) memory are restored, 353.

Said BIOS may further load the identified codec(s), 354, drivers for the respective system components may be loaded, 355, and a resumed state (e.g., "S0") is completed, 356. In some embodiments, the OS may launch an appropriate application for the audio device, 357. In some embodiments, the sleep state may be resumed if removal of the audio jack plug from the audio jack socket is detected.

Figure 4:
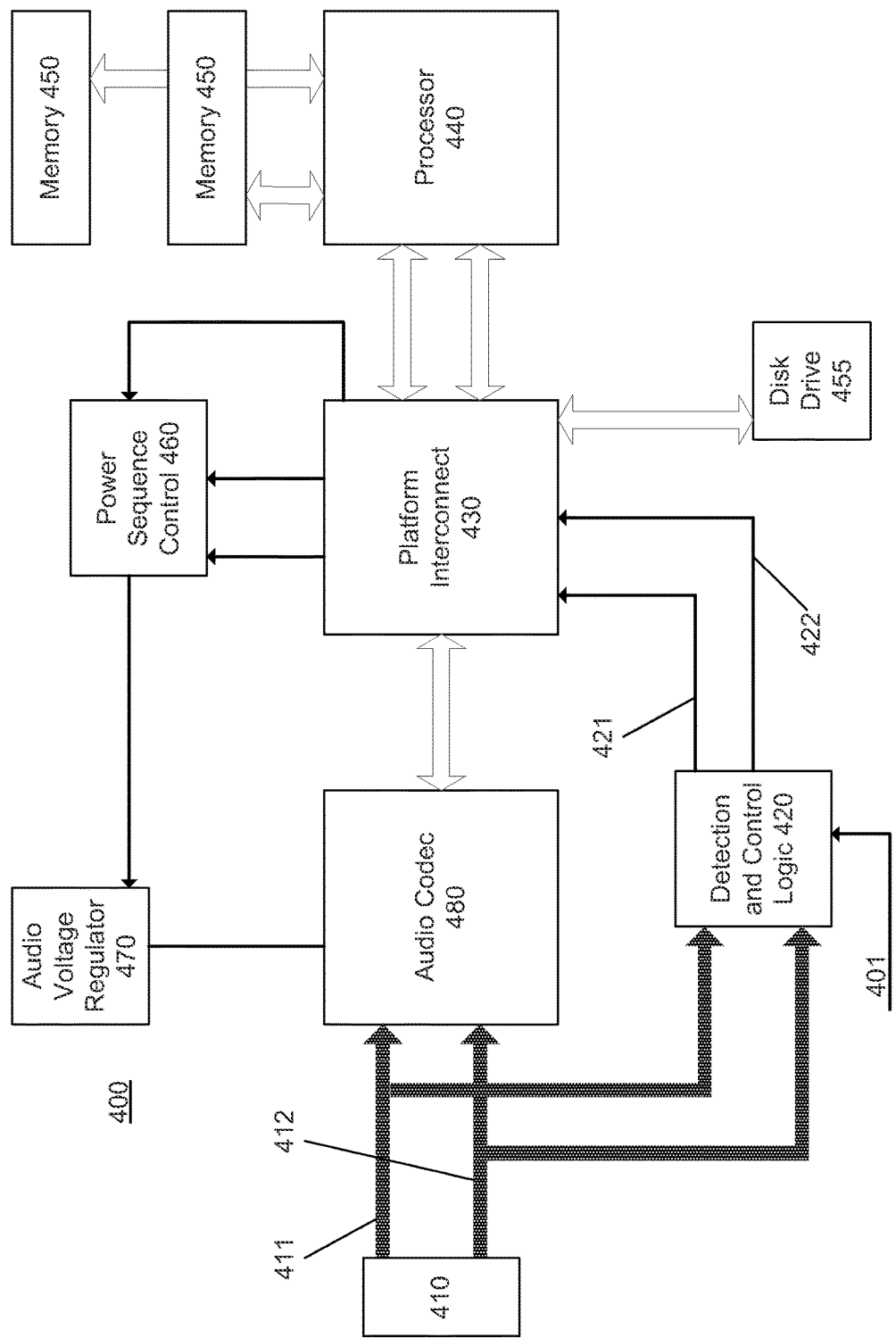
FIG. 4 is a block diagram of system components implementing an embodiment of the invention.

FIG. 4 is a block diagram of system components implementing an embodiment of the invention. In this embodiment, system 400 includes audio jack socket 410, which is capable of determining whether an audio jack plug for an audio device with input and/or output capabilities has been inserted. Audio jack socket 410 may communicate audio output device signal 411 and/or audio input device signal 412 to detection and control logic 420.

The detection and control logic may receive sleep state signal 401, which will indicate whether system 400 is in a sleep state, and if so, which sleep state. Detection and control logic 420 will send wake event 421 for audio input devices and wake event 422 for audio output devices (it may also bend both events if, for example, a combination headphone/microphone device is detected).

Platform interconnect 430 (alternatively referred to herein as I/O Hub) may receive the system wake event(s) from detection and control logic 420, and initiate a power up sequence for processor 440 and system memory 450 via power sequence control block 460. In some embodiments, depending on the sleep state system 400 was in, system context may be restored from system memory 450 (for suspend to system memory modes) or disk memory 455 (for suspend to disk modes).

Audio voltage regulator 470 may be brought online and appropriate audio codec(s) 480 may be loaded so that the system is active and ready to utilize the audio device plugged into audio jack socket 410.

Figure 5:
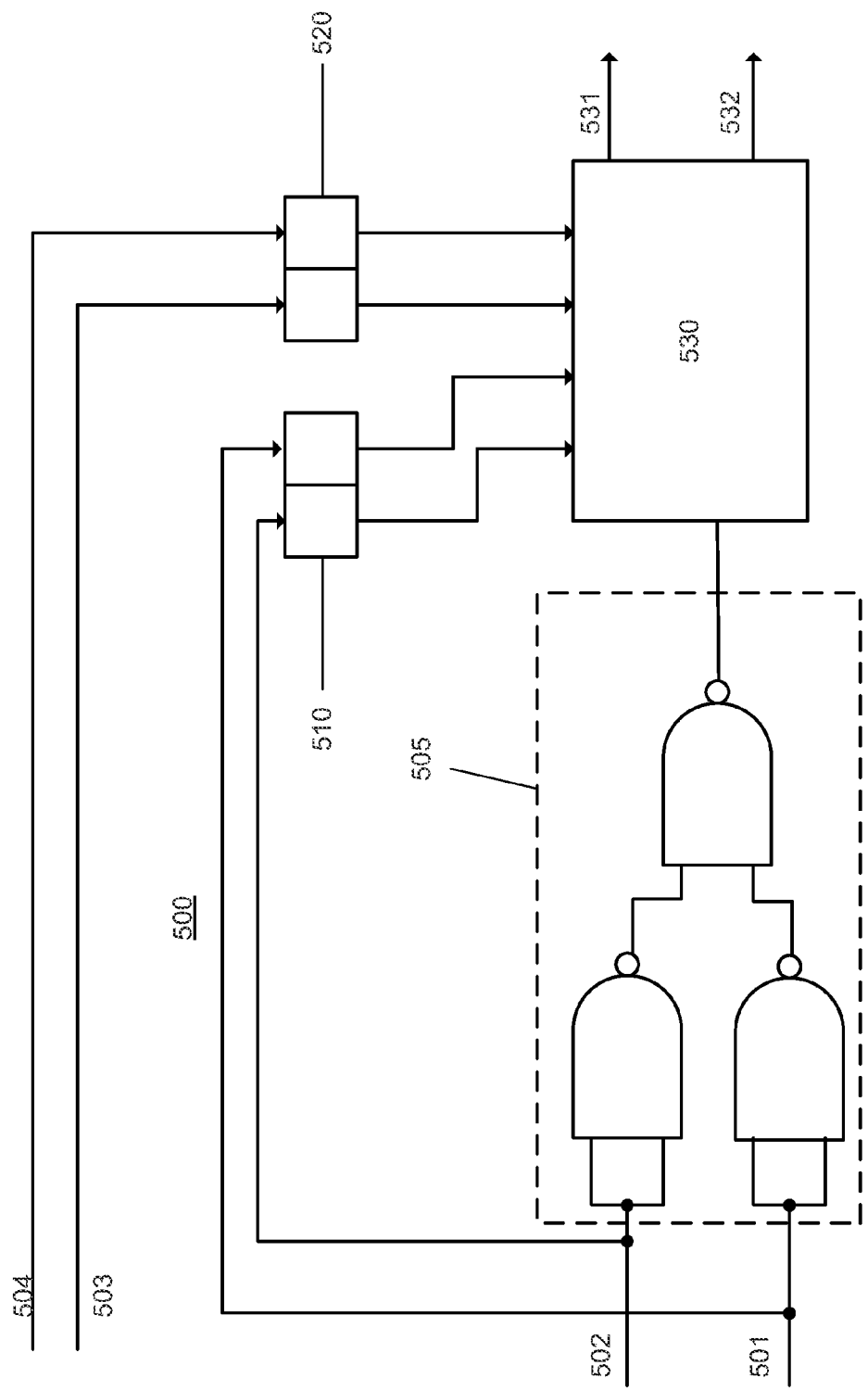
FIG. 5 is a block diagram of detection and control logic according to an embodiment of the invention.

FIG. 5 is a block diagram of detection and control logic according to an embodiment of the invention. In this embodiment, detection and control logic block 500 receives signals 501 and 502 indicating whether an audio output device or an audio input device is detected in a system audio jack socket (or sockets), respectively. OR logic 505 will send an indication to wake event generation logic 530 when at least one of said audio devices is detected.

Data indicating whether the system is in a save to RAM sleep state (referred to in this example embodiment as S3) or a save to disk sleep state (referred to as S4) is also received by detection and control block 500 as signals 503 and 504, respectively. Signals 501 and 502 are paired together in register 510, while signals 503 and 504 are paired together in register 520. Data from said registers is forwarded to wake event generation logic 530. In this embodiment, wake event generation logic 530 will generate wake_audio_input signal 531 and/or wake_audio_output_signal 532 based on the following possible data inputs from registers 510 and 520 as shown in FIG. 5:

| Audio Input Device | Audio Output Device | S3_Sleep | S4_Sleep | Wake_Audio_In | Wake_Audio_Out |
|---|---|---|---|---|---|
| 1 | 0 | 1 | 0 | Yes (for S3) | No |
| 1 | 0 | 0 | 1 | Yes (for S4) | No |
| 0 | 1 | 1 | 0 | No | Yes (for S3) |
| 0 | 1 | 0 | 1 | No | Yes (for S4) |
| 1 | 1 | 1 | 0 | Yes (for S3) | Yes (for S3) |
| 1 | 1 | 0 | 1 | Yes (for S4) | Yes (for S4) |
| 0 | 0 | X | X | No | No |

Figure 6:
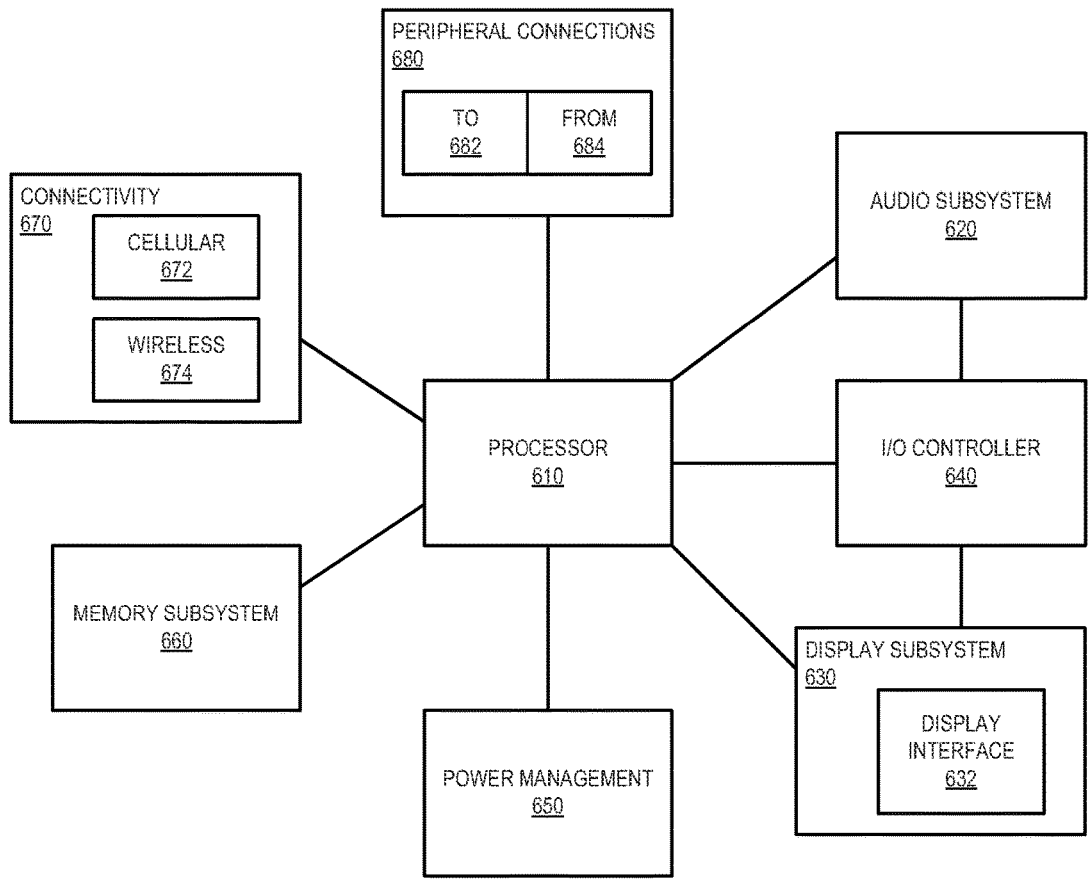
FIG. 6 is block diagram of a device that may utilize an embodiment of the invention.

FIG. 6 is block diagram of a device that may utilize an embodiment of the invention. Computing device 600 represents a mobile computing device, such as a computing tablet, a mobile phone or smartphone, a wireless-enabled e-reader, or other wireless mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, processor cores, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, or other hardware that can be included in device 600. The input can be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Power management 650 may implement any of the above described embodiments of the invention to detect, during a host platform sleep state, a peripheral device audio jack plug being coupled to (e.g., inserted into) an audio jack connection socket.

Memory subsystem 660 includes memory devices for storing information in device 600. Memory can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600.

Connectivity 670 includes hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 674 refers to wireless connectivity that is not cellular, and can include personal area networks (such as Bluetooth), local area networks (such as WiFi), and/or wide area networks (such as WiMax), or other wireless communication.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
   a processor to execute a sleep state entrance routine;
   a system memory to store system information in response to the processor executing the sleep state entrance routine;
   one or more audio jack sockets;
   detection and control logic to generate an audio input device wake event signal and an audio output device wake event signal as separate signals within the system, the audio input device wake event signal being generated in response to detection of an audio plug being inserted into the one or more audio jack sockets for an audio device that sends audio information into the system, the audio output device wake event signal being generated in response to detection of an audio plug being inserted into the one or more audio jack sockets for an audio device that receives audio information from the system, wherein the audio input device wake event signal is distinguishable from the audio output device wake event signal so that a basic input/output system (BIOS) of the system:
   1) loads an audio input codec during a power up sequence in response to the audio input device wake event signal without interrogation by a power management unit as to the cause of the wake up and,
   2) loads an audio output codec during a power up sequence in response to the audio output device wake event signal without interrogation by the power management unit as to the cause of the wake up.

2. The system of claim 1, wherein the sleep state comprises a suspend to random access memory (RAM) sleep mode, and the system memory comprises system RAM memory.

3. The system of claim 1, wherein the sleep state comprises a suspend to disk drive memory mode, and the system memory comprises system disk drive memory.

4. The system of claim 1, wherein the power-up sequence comprises basic input/output system (BIOS) instructions.

5. The system of claim 1, wherein the system is included in a tablet computer, and the system further comprises a display device deactivated during the sleep state.

6. The system of claim 1, wherein the processor is to leave the sleep state in response to either of the audio device wake event signals.

7. An apparatus comprising:
   a processor to execute a sleep state entrance routine;
   one or more audio jack sockets;
   detection and control circuitry to generate an audio input device wake event signal in response to detection of an audio plug being inserted into the one or more audio jack sockets for an audio input device that sends audio information into the apparatus and to generate a separate audio output device wake event signal in response to detection of an audio plug being inserted into the one or more audio jack sockets for an audio output device that receives audio information from the apparatus, wherein the audio input device wake event signal is distinguishable from the audio output device wake event signal so that a basic input/output system (BIOS) of the apparatus:
   1) loads an audio input codec during a power up sequence in response to the audio input device wake event signal without interrogation by a power management unit as to the cause of the wake up; and
   2) loads an audio output codec during a power up sequence in response to the audio output device wake event signal without interrogation by the power management unit as to the cause of the wake up.

8. The apparatus of claim 7, wherein the power-up sequence comprises basic input/output system (BIOS) instructions.

9. The apparatus of claim 7, wherein the processor is to wake up in response to the audio input and output wake event signals.

10. A method, comprising:
    detecting, during a platform sleep state, an audio jack plug being newly coupled to an audio jack socket;
    generating a platform audio input wake event signal in response to the detecting of the audio jack plug being newly coupled to the audio jack socket, the audio input wake event signal distinguishing between an audio input device wake event and an audio output device wake event;
    waking the platform in response to the audio input wake event signal, the waking including a basic input/output system (BIOS) of the platform:
    1) automatically loading an input codec without interrogating as to the cause of the wake up if the audio input wake event signal indicates that an audio input device is connected to the audio jack plug;
    2) automatically loading an output codec without interrogating as to the cause of the wake up if the audio input wake event signal indicates that an audio output device is connected to the audio jack plug.

11. The method of claim 10, wherein the platform sleep state comprises a suspend to random access memory (RAM) sleep mode.

12. The method of claim 10, wherein the platform sleep state comprises a suspend to disk drive memory mode.

* * * * *